United States Patent [19]

Price

[11] 4,179,933
[45] Dec. 25, 1979

[54] GAGE CONSTRUCTION AND CASING BODY THEREFOR

[75] Inventor: Larry V. Price, Knoxville, Tenn.

[73] Assignee: Robertshaw Controls Company, Richmond, Va.

[21] Appl. No.: 881,353

[22] Filed: Feb. 27, 1978

[51] Int. Cl.² ........................................... G01D 11/24
[52] U.S. Cl. ..................................... 73/431; D10/46; D10/102
[58] Field of Search .................. 73/431; D10/85, 102, D10/103; 58/88 R, 90 R

[56] References Cited

U.S. PATENT DOCUMENTS

| | | | |
|---|---|---|---|
| D. 60,085 | 12/1921 | Christopher | D10/102 |
| D. 156,571 | 12/1949 | Snow | D10/85 X |
| D. 183,968 | 11/1958 | Henss | D10/102 |
| D. 224,806 | 9/1972 | Zuck | D10/102 X |
| D. 236,816 | 9/1975 | Martin | D10/85 |
| 2,271,423 | 1/1942 | Graesser et al. | 73/431 |
| 2,294,175 | 8/1942 | Graesser et al. | 73/431 X |
| 2,995,106 | 8/1961 | Granada | 116/129 R |
| 3,096,654 | 7/1963 | DuBois | 73/431 |
| 3,141,335 | 7/1964 | Smith | 73/738 |
| 3,320,813 | 5/1967 | Taylor et al. | 73/431 |
| 3,543,586 | 12/1970 | Waite | 73/431 |
| 3,659,457 | 5/1972 | Ostrowski | 73/431 X |
| 3,810,390 | 5/1974 | Neugebauer | 73/743 |
| 4,030,360 | 6/1977 | Fortune | 73/431 X |

Primary Examiner—Daniel M. Yasich
Attorney, Agent, or Firm—Candor, Candor & Tassone

[57] ABSTRACT

A gage construction having a casing body provided with a generally circular front face interconnected to a rear mounting flange by an annular side wall disposed therebetween and which generally increases radially outwardly from the front wall to the rear mounting flange, the side wall having a generally polygonal exterior surface portion adjacent the rear mounting flange and a generally frusto-conical exterior surface portion adjacent the front face. The surface portions blend together between the front face and the rear mounting flange.

12 Claims, 5 Drawing Figures

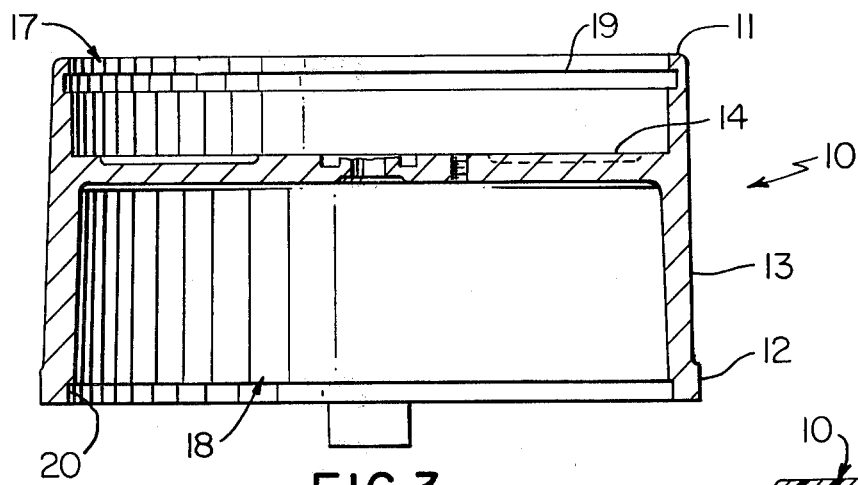
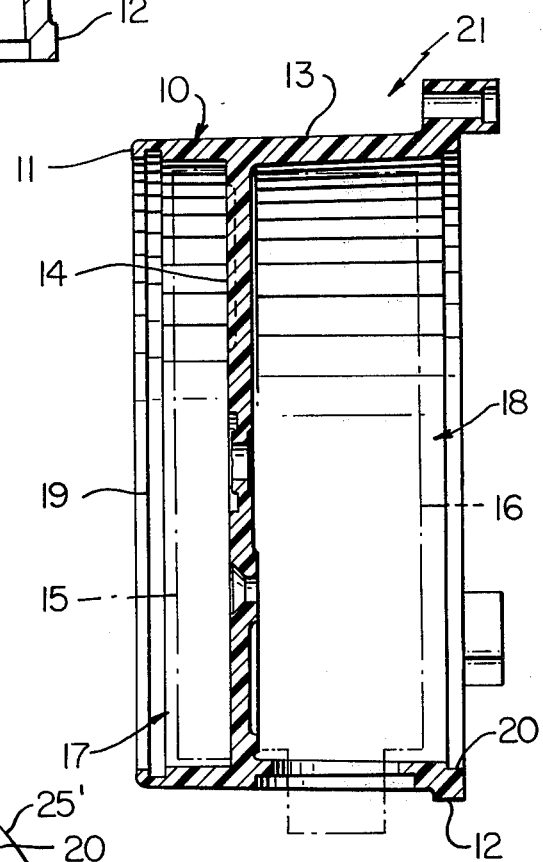
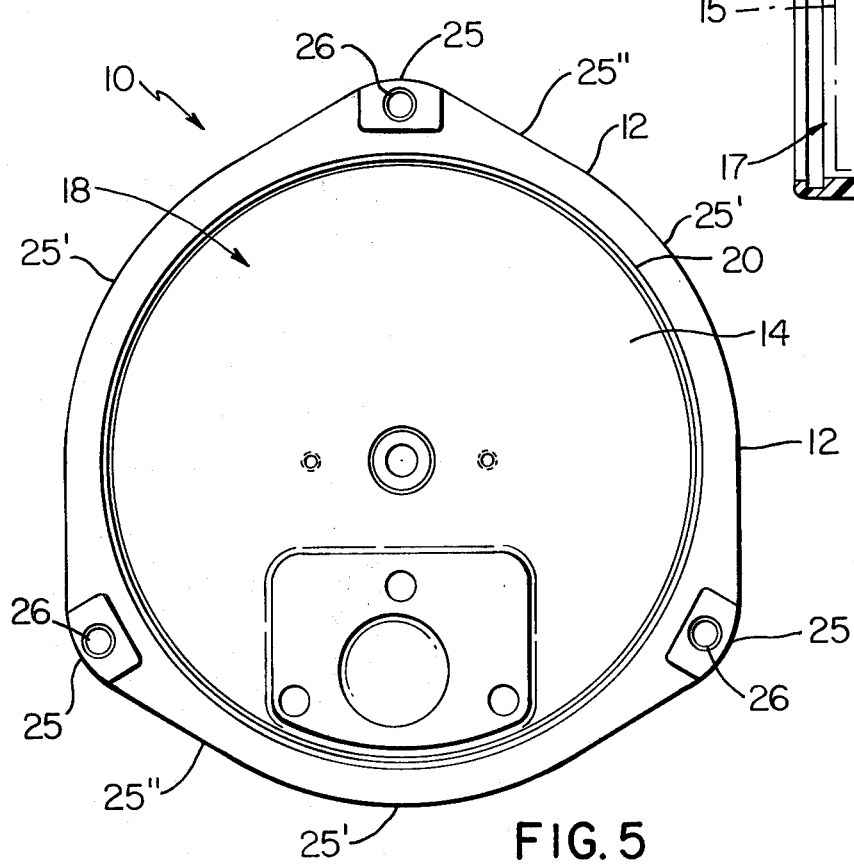

GAGE CONSTRUCTION AND CASING BODY THEREFOR

BACKGROUND OF THE INVENTION

1. Field of the Invention

This invention relates to an improved gage construction and to an improved casing body for such a gage construction or the like, as well as to a method of making such a casing body or the like.

2. Prior Art Statement

It is known to provide a gage construction having a casing body provided with a generally circular front face interconnected to a rear mounting flange by an annular side wall means disposed therebetween.

For example, see the following two U.S. Pat. Nos.:
(1) U.S. Pat. No. 2,294,175—Graesser et al
(2) U.S. Design Pat. No. 224,806—Zuck
(3) U.S. Pat. No. 3,810,390—Neugebauer
(4) U.S. Design Pat. No. 236,816—Martin It appears that the side wall of the casing body of the gage construction of item (1) above is substantially frusto-conical with the smaller end thereof terminating at the front face and the larger end thereof terminating at the rear mounting flange so that grooves are cut into the exterior wall to provide for the insertion of mounting bolts to fasten the gage construction to the desired structure.

It appears that the casing body of the gage construction of item (2) above has a side wall that is substantially cylindrical from the front face to the rear mounting flange thereof with the rear mounting flange having a generally triangular configuration with the mounting holes passing therethrough at the corners of the flange outboard of the cylindrical side wall.

It appears that the side wall of the casing body of the gage construction of item (3) above has twelve coarse serrations or knurls extending between the front and rear faces thereof.

It appears that the side wall of the casing body of the gage construction of item (4) above has a plurality of flat sides that extend between the front and rear faces thereof.

SUMMARY OF THE INVENTION

It is a feature of this invention to provide a casing body for a gage construction wherein the weight of the casing body can be relatively light while the casing body is still relatively strong.

In particular, it has been found that the conventional turret style casing body has a side wall means extending between the circular front face thereof and the rear mounting flange thereof with a substantially frusto-conical configuration that generally increases radially outwardly from the front wall to the rear mounting flange so that the same is relatively heavy and requires a large amount of material to produce the same.

However, it was found according to the teachings of this invention that the side wall means of the casing body can be provided with a polygonal exterior surface to render the same substantially light-weight while still being relatively strong.

In particular, one embodiment of this invention provides a gage construction having a casing body provided with a generally circular front face interconnected to a rear mounting flange by an annular side wall means disposed therebetween and which generally increases radially outwardly from the front face to the rear mounting flange, the side wall means having a generally polygonal exterior surface portion adjacent the rear mounting flange and a generally frusto-conical exterior surface portion adjacent the front face. The surface portions blend together between the front face and the rear mounting flange.

Accordingly, it is an object of this invention to provide an improved gage construction having one or more of the novel features of this invention as set forth above or hereinafter shown or described.

Another object of this invention is to provide a casing body for a gage construction or the like, the casing body of this invention having one or more of the novel features of this invention as set forth above or hereinafter shown or described.

Another object of this invention is to provide an improved method of making such a casing body or the like, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

BRIEF DESCRIPTION OF THE DRAWINGS

FIG. 3 is a cross-sectional view taken on line 3—3 of FIG. 2.

FIG. 4 is a cross-sectional view taken on line 4—4 of FIG. 2, FIG. 4 schematically illustrating the completed gage construction as plastic and utilizing the casing body of FIG. 1.

FIG. 5 is an enlarged rear view of the casing body illustrated in FIG. 1.

DESCRIPTION OF THE PREFERRED EMBODIMENT

Figure 1:
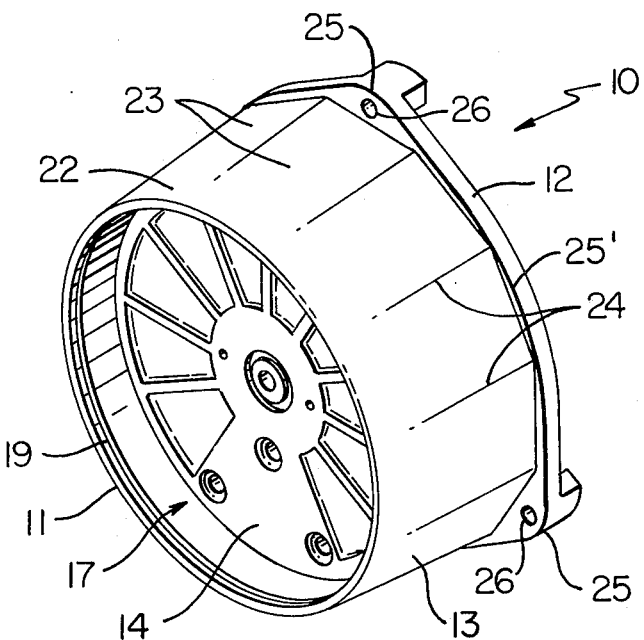
FIG. 1 is a perspective view of the improved casing body of this invention.

While the various features of this invention are hereinafter described and illustrated and being particularly adapted to provide a casing body having a particular configuration, it is to be understood that the various features of this invention can be utilized singly or in any combination thereof to provide a casing body having another configuration without departing from the inventive scope of this invention as will be apparent hereinafter.

Therefore, this invention is not to be limited to only the embodiment illustrated in the drawings, because the drawings are merely utilized to illustrate one of the wide variety of uses of this invention.

Referring now to FIG. 1, the improved casing body of this invention is generally indicated by the reference numeral 10 and comprises a one-piece plastic structure, such as glass reinforced polypropylene or any other suitable shock-resistant plastic or other material, and has a generally circular front face 11 and a rear mounting flange 12 with an annular side wall means 13 disposed therebetween. If desired, the casing body 10 can include an integral interior wall 14 for mounting suitable gage components, such as gage components 15 and 16 schematically illustrated in FIG. 4 in a manner well known in the art.

In particular, the front face 11 of the casing body 10 can be interrupted by a substantially cylindrical opening 17 while the rear flange 12 can be interrupted by a substantially frusto-conical opening 18 as illustrated to respectively receive the gage components 15 and 16 therein as well as a suitable glass cover or lens arrangement (not shown) to be received in an annular groove 19 and a closure member (not shown) to be received in an annular groove 20 in any suitable manner to complete the gage construction of this invention that is generally indicated by the reference numeral 21 in FIG. 4.

For example, see the U.S. Pat. to Smith, No. 3,141,335, which illustrates in FIG. 3 thereof how components similar to 15 and 16 can be mounted in the hollow casing body 10 on opposite sides of the wall 14 thereof with the component means 16 having a part thereof projecting out of a lower opening in the casing wall 13 as illustrated by the dash dotted line in FIG. 4.

The side wall means 13 of the casing body 10 of this invention is provided with an exterior annular surface 22 which is formed with a polygonal configuration and in the particular configuration illustrated in the drawings, the polygonal side wall means 13 is provided with 12 sides 23 so as to be dodecagonal. While the sides 23 are illustrated as being substantially flat throughout the majority of their surface area from the front wall 11 to the rear mounting flange 12, it is to be understood that the same could be concave or convex between the corners 24 and the 12 corners 24 may be more defined ribs as desired. Also, the corners 24 can extend completely to front face 11, if desired, whereby the front face 11 will still be generally circular.

However, in the embodiment of the casing body 10 illustrated in the drawings, it can be seen that the annular side wall means 13 generally increases radially outwardly from the front wall 11 to the rear mounting flange 12 with the side wall means 13 having the generally polygonal exterior surface portion disposed adjacent the rear mounting flange 12 and a generally frusto-conical exterior surface portion disposed adjacent the front face 11. Such surface portions blend together between the front face 11 and the rear mounting flange 12 as best illustrated in FIG. 1.

If desired, the opening 18 formed in the rear of the casing body 10 could conform to the polygonal configuration of the exterior surface 22 rather than be substantially frusto-conical as illustrated.

Figure 2:
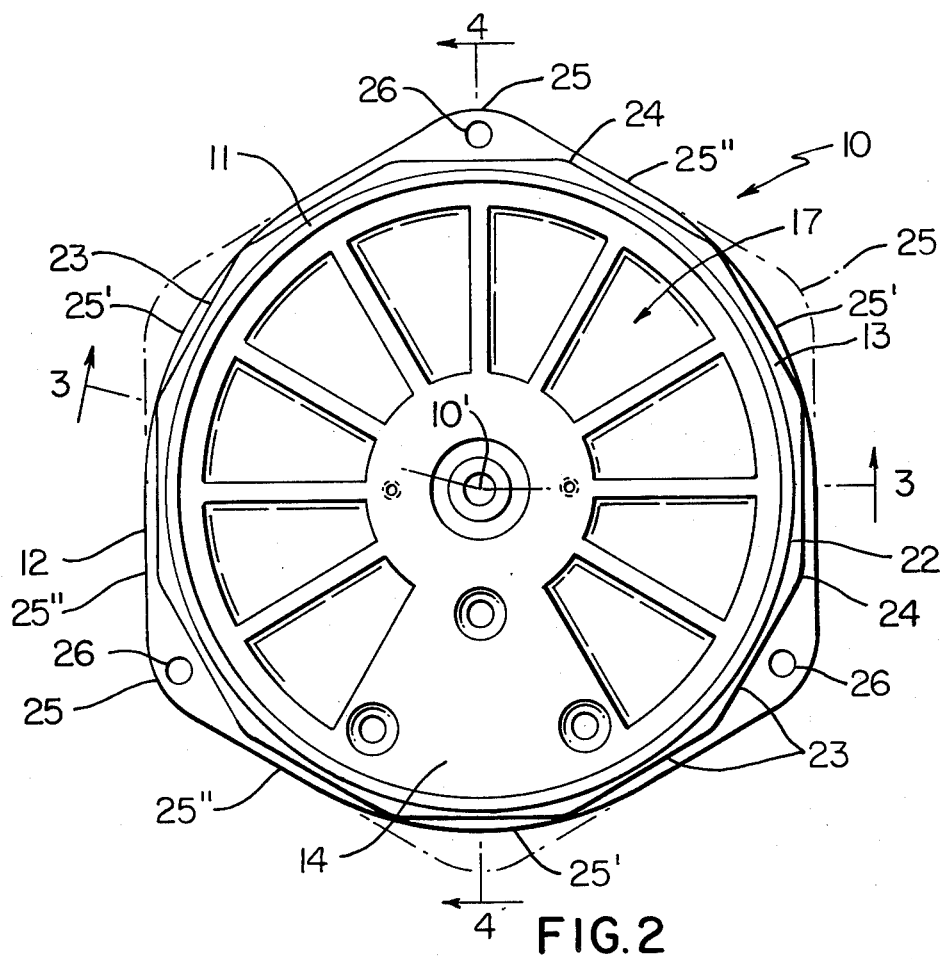
FIG. 2 is an enlarged front view of the casing body illustrated in FIG. 1.

The rear mounting flange 12 of the casing body 10 of this invention would normally have a hexagonal configuration as illustrated in FIG. 2 so as to provide six corners 25 that extend radially outwardly beyond the flat sides 23 of the exterior surface 22 except that every other corner 25 has been reduced, such as by describing an arc from the longitudinal center 10' of the casing body 10 at the removed corners 25 that are indicated by dotted lines in FIG. 2. In this manner, only three relatively large corners 25 are provided on the mounting flange 12 while three reduced corners 25' interposed therebetween as illustrated.

The remaining corners 25 of the mounting flange 12 are each provided with a mounting opening 26 passing therethrough and being disposed substantially parallel to the center longitudinal axis 10' of the casing body 10 and substantially bisecting the respective flat side 23 while being disposed reaially beyond the same as illustrated.

Thus, it can be seen that it is relatively easy to mount the completed gage construction 21 to any supporting surface, such as a wall or the like, by inserting fastening means through the openings 26 without requiring the fastening means to be confined in grooves as is provided in the conventional turret shaped casing body previously described.

The exterior surface 22 of the side wall means 13 of the casing body 10 of this invention generally increases radially outwardly from the front wall 11 to the rear mounting flange 12 in substantially a smooth manner so that the outer surface 22 can be wiped clean much easier than one that is provided with channels at the mounting holes thereof as well as elsewhere to remove excessive material therefrom.

Therefore, it can be seen that this invention provides an improved gage casing body 10 that can be formed by the method of this invention to produce the gage construction 21 illustrated in FIG. 4 by merely inserting the gage components 15 and 16 therein and fastening the same to the interior wall 14 thereof in any desired manner, the openings 17 and 18 thereafter being closed by suitable lens and cover structures.

By forming the casing body 10 of this invention with a strong shock-resistant plastic material, such as an aforementioned glass reinforced polypropylene, the casing body 10 of this invention makes it economical now not to use the heavy turret style phenolic case presently conventional in the art.

Thus, it can be seen that the casing body 10 of this invention utilizes a minimum of material in the outer wall 13 and mounting flange 12 thereof with the corners 24 of the dodecagonal shape acting as ribs which strengthen the outer wall 13 and the mounting corners 25. In addition to the savings of material with the casing body 10 of this invention, there will also be a reduction in shipping costs not only to the manufacturer of the resulting gage constructions 21, but also to the customers who buy such gage constructions 21.

The external strengthening of the casing body 10 by the dodecagonal shape allows the inside diameter of the rear opening 18 into the casing body to be larger and thereby provide more working room for calibration.

With the outside diameter of the front face 11 of the casing body 10 being a minimum for most front end designs for gage constructions and with the three mounting holes 26 and the bolt head clearance around them having standardized dimensions there is only a small amount of draft on the outer wall 13 at the mounting holes 26 which is probably insufficient for molding a round outer wall. Since the draft increases toward the corners 24 of the dodecagonal shape, the average draft is large enough for molding purposes.

It can be seen that a desirable appearance is provided for the casing body 10 of this invention because of the shape of the front face 11 thereof and the outer wall 13 which is continuous around the full circumference of the casing body. There is also a blending of the round front face 11 with the large radius portions 25' of the rear flange 12 and a blending of alternate flats 23 on the dodecagonal shape with the flats 25" on the hexagonal portions of the rear mounting flange 12 as fully illustrated in FIG. 2.

However, the rear flange 12 may be more or less hexagonal shaped or round, as desired.

Therefore, it can be seen that this invention not only provides an improved gage construction and casing body therefor, but also this invention provides an improved method of making such a casing body or the like.

While the forms and method of this invention have been described and illustrated as required by the Patent Statute, it is to be understood that other forms and method steps can be utilized and still fall within the scope of the appended claims.

What is claimed is:

1. In a gage construction having a substantially hollow casing body for containing gage components therein and being provided with a circular front face interconnected to a rear mounting flange by an annular side wall means disposed therebetween, said side wall means generally increasing radially outwardly from said front wall to said rear mounting flange, the improvement wherein said side wall means has a generally polygonal exterior surface portion adjacent said rear mounting flange and a generally frusto-conical exterior surface portion adjacent said front face, said surface portions blending together between said front face and said rear mounting flange.

2. A gage construction as set forth in claim 1 wherein each side of said polygonal exterior surface portion is substantially flat.

3. A gage construction as set forth in claim 1 wherein said flange has a plurality of mounting openings passing therethrough, each said opening substantially bisecting a respective side of said polygonal exterior surface portion and being disposed radially outwardly therefrom.

4. A gage construction as set forth in claim 1 wherein said polygonal exterior surface portion is dodecagonal and said flange has a generally hexagonal configuration with every other corner thereof being radially reduced.

5. A gage construction as set forth in claim 1 wherein said casing body is a one-piece structure.

6. A gage construction as set forth in claim 5 wherein said one-piece structure is formed of plastic material.

7. In a substantially hollow casing body for containing gage components of a gage construction therein, said casing body being provided with a circular front face interconnected to a rear mounting flange by an annular side wall means disposed therebetween, said side wall means generally increasing radially outwardly from said front wall to said rear mounting flange, the improvement wherein said side wall means has a generally polygonal exterior surface portion adjacent said rear mounting flange and a generally frusto-conical exterior surface portion adjacent said front face, said surface portions blending together between said front face and said rear mounting flange.

8. A casing body as set forth in claim 7 wherein each side of said polygonal exterior surface portion is substantially flat.

9. A casing body as set forth in claim 7 wherein said flange has a plurality of mounting openings passing therethrough, each said opening substantially bisecting a respective side of said polygonal exterior surface portion and being disposed radially outwardly therefrom.

10. A casing body as set forth in claim 7 wherein said polygonal exterior surface portion is dodecagonal and said flange has a generally hexagonal configuration with every other corner thereof being radially reduced.

11. A casing body as set forth in claim 7 wherein said casing body is a one-piece structure.

12. A casing body as set forth in claim 10 wherein said one-piece structure is formed of plastic material.

* * * * *